United States Patent
Bittner

(10) Patent No.: US 11,849,717 B2
(45) Date of Patent: Dec. 26, 2023

(54) INTERNALLY BONDED HINGE CASTINGS IN COMPOSITE BOOM STRUCTURE

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

(*) Notice: Subject to any disclaimer, the term of this patent is extended or adjusted under 35 U.S.C. 154(b) by 1082 days.

(21) Appl. No.: 16/444,020

(22) Filed: Jun. 18, 2019

(65) Prior Publication Data

US 2020/0396979 A1 Dec. 24, 2020

(51) Int. Cl.
*A01M 7/00* (2006.01)

(52) U.S. Cl.
CPC ........ *A01M 7/0075* (2013.01); *A01M 7/0082* (2013.01)

(58) Field of Classification Search
CPC .......................... A01M 7/0075; A01M 7/0082
See application file for complete search history.

(56) References Cited

U.S. PATENT DOCUMENTS

| | | | |
|---|---|---|---|
| 5,704,185 A | 1/1998 | Lindsay | |
| 8,950,968 B2* | 2/2015 | Reimchen | B60R 1/00 403/109.3 |
| 9,359,817 B2 | 6/2016 | Allred, III et al. | |
| 9,637,923 B2 | 5/2017 | Radhouane et al. | |
| 9,828,771 B2 | 11/2017 | Barker et al. | |
| 9,884,663 B2 | 2/2018 | Czinger et al. | |
| 10,085,437 B2 | 10/2018 | Mariani et al. | |
| 2016/0038961 A1 | 2/2016 | Carlson et al. | |
| 2016/0286781 A1* | 10/2016 | Mariani | B05B 1/185 |
| 2017/0305471 A1 | 10/2017 | Gami et al. | |
| 2019/0098846 A1* | 4/2019 | Murphy | A01M 7/0042 |
| 2019/0357519 A1* | 11/2019 | Castro | A01C 23/047 |

FOREIGN PATENT DOCUMENTS

| | | |
|---|---|---|
| CN | 201400267 U | 2/2010 |
| CN | 102278342 B | 1/2013 |
| EP | 0525605 B1 | 5/1998 |
| GB | 2287491 A | 9/1995 |
| WO | 1999049150 A1 | 9/1999 |

OTHER PUBLICATIONS

Carbon Fiber Tube Assemblies; Bonded Assemblies; www.carbonfibertubeshop.com/bonded%20assemblies.html; 17 pages; Nov. 10, 2018.

* cited by examiner

*Primary Examiner* — Steven M Cernoch
(74) *Attorney, Agent, or Firm* — Rebecca L. Henkel; Rickard K. DeMille

(57) ABSTRACT

An agricultural machine includes a lift arm assembly and a boom including at least one support member. A first support member of the at least one support member is coupled to the lift arm assembly. Further, the first support member includes a tube and a hinge inserted into a first end of the tube. The hinge includes an extension portion disposed within the hollow tube and a hinged portion extending upward from a first end of the extension portion. The first end of the extension portion is adjacent the first end of the tube. Further, the first support member is coupled to the lift arm assembly by way of the hinged portion of the hinge.

8 Claims, 4 Drawing Sheets

INTERNALLY BONDED HINGE CASTINGS IN COMPOSITE BOOM STRUCTURE

FIELD OF THE INVENTION

The invention relates generally to a spray boom for an agricultural sprayer, and, more particularly, a spray boom having a support member with an internally bonded hinge casting to optimize weight and stress characteristics.

BACKGROUND OF THE INVENTION

As spray booms get larger over time, alternate structural materials to steel become more attractive, due to the altering relationships between cost, weight, and stress characteristics. Composite materials like carbon fiber can carry distributed load well but are often challenged by stress concentrations at points of fixation. Other materials, such as aluminum, are often used in areas of high stress or wear, but the interface or joint between these different materials cause their own stress issues.

The common way to attach aluminum to carbon fiber is by bolting, riveting, and/or gluing the aluminum to the outer surface. As such there is a need in the art for a method bonding the parts together at the inner surface of the carbon fiber to provide adequate surface area to keep the load distributed in the carbon fiber and allow the load to be distribute to the aluminum more uniformly.

SUMMARY OF THE INVENTION

According to an aspect of the invention, a spray boom support member for an agricultural machine includes a hollow tube and a hinge casting inserted into a first end of the hollow tube. The hinge casting includes an extension portion extending into the hollow tube for a length and a hinged portion extending upward from a first end of the extension portion. Further, the first end of the extension portion is adjacent the first end of the hollow tube.

In accordance with another aspect of the invention, the hollow tube includes an opening formed through a surface thereof at a location spaced apart from the first end of the hollow tube. In addition, the extension portion includes a notch in a surface thereof at a location adjacent a second end of the extension portion. The orifice and the notch are aligned with each other when the hinge casting is disposed within the hollow tube. A bracket may be disposed within the orifice and the notch to be coupled to the extension portion.

In accordance with yet another aspect of the invention, the hinged portion includes a channel extending from a first side of the hinged portion to a second side of the hinged portion. The channel may be disposed adjacent an upper surface of the hinged portion. In addition, the bracket may include a mounting orifice formed therethrough. Further, the hollow tube may comprise a composite material, and the hinge casting may comprise aluminum.

According to another aspect of the invention, a method of manufacturing a spray boom support member includes providing a hollow tube, disposing a hinge casting within an end of the hollow tube, and securing the hinge in place by coupling a bracket to the hinge casting. An extension portion of the hinge casting extends into the hollow tube for a length. Further, a hinged portion of the hinge casting extends upward from a first end of the extension portion.

In accordance with yet another aspect of the invention, the method further includes forming an opening in a surface of the hollow tube and forming a notch in a surface of the extension portion. The orifice and the notch are aligned when the hinge casting is disposed within the hollow tube. The hinge casting is secured in place by coupling a bracket to the hinge casting, which includes disposing the bracket through the orifice of the hollow tube and in the notch of the extension portion and securing the bracket to the extension portion.

In accordance with another aspect of the invention, the method also includes forming a channel in the hinged portion of the hinge casting, wherein the channel extends from a first surface of the hinged portion to a second surface of the hinged portion. In addition, a mounting orifice may be formed in the bracket.

According to yet another aspect of the invention, an agricultural machine includes a lift arm assembly and a boom including at least one support member. A first support member of the at least one support member is coupled to the lift arm assembly. Further, the first support member includes a tube and a hinge inserted into a first end of the tube. The hinge includes an extension portion disposed within the hollow tube and a hinged portion extending upward from a first end of the extension portion. The first end of the extension portion is adjacent the first end of the tube. Further, the first support member is coupled to the lift arm assembly by way of the hinged portion of the hinge.

In accordance with another aspect of the invention, the tube includes an opening formed through a surface thereof at a location spaced apart from the first end of the tube. Additionally, the extension portion include a notch in a surface thereof at a location adjacent a second end of the extension portion. The orifice and the notch are aligned with each other when the hinge is disposed within the tube. Further yet, a bracket may be disposed within the orifice and the notch. The bracket is coupled to the extension portion. The tube may be comprised of a composite material.

In accordance with yet another aspect of the invention, the notch forms a planar surface on the extension portion. The bracket is coupled to the planar surface on the extension portion. In addition, the bracket includes a planar surface configured to interfit with the planar surface on the extension portion.

In accordance with another aspect of the invention, the bracket includes a mounting orifice for mounting the bracket to the lift arm assembly. Further, the hinged portion includes a channel extending from a first side of the hinged portion to a second side of the hinged portion for mounting the hinge to the lift arm assembly.

These and other aspects and features of the present invention will be more fully understood from the following detailed description and the enclosed drawings.

Figure 1:
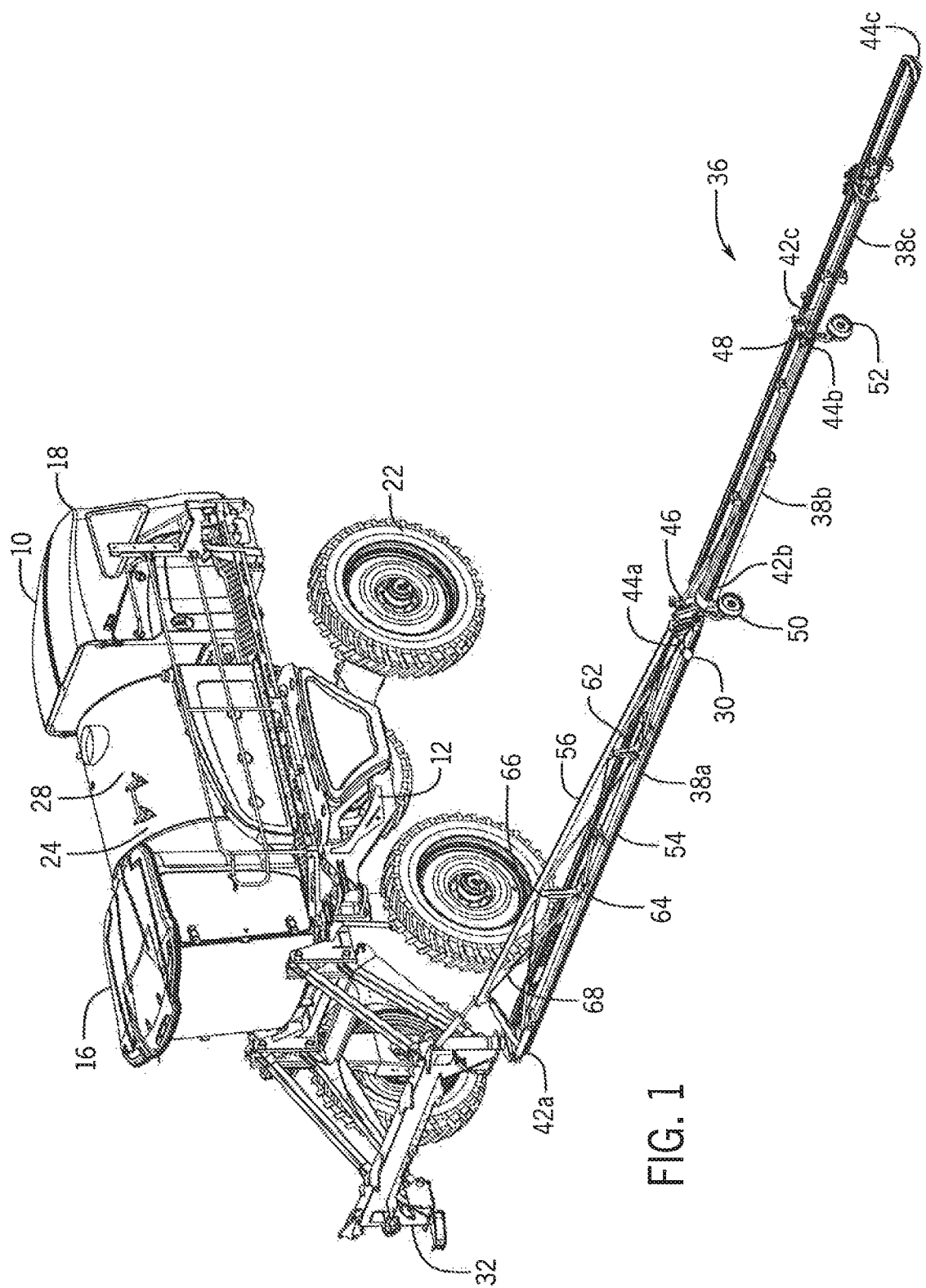
FIG. 1 is a perspective view of an agricultural sprayer having a spray boom.

Before describing any preferred, exemplary, and/or alternative embodiments of the invention in detail, it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION

Referring now to the drawings and specifically to FIG. 1, aspects of the invention are shown for use with an agricultural machine 10, for example, but not limited to, an agricultural sprayer. The agricultural machine 10 shown in FIG. 1 is a self-propelled agricultural sprayer vehicle or self-propelled sprayer 10, shown here as a front-boom sprayer. Although sprayer 10 is shown as a front-boom self-propelled sprayer, it is understood that the sprayer 10 may instead be configured as a rear-boom sprayer.

Still referring to FIG. 1, the sprayer 10 includes a chassis 12 having a chassis frame 14 that supports various assemblies, systems, and components. These various assemblies, systems, and components can include an operator cab 16, an engine 18, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to manipulate the boom 30 in a variety of directions to both adjust the height of application of the product and transition the boom 30 between a retracted position 34, as shown in FIG. 10, and an extended position 36, as shown in FIG. 1. While FIG. 1 displays a single boom 30 coming from one side of the lift arm assembly 32, embodiments of the invention may include a boom 30 coming from both sides of the lift arm assembly 32.

As further shown in FIG. 1, the spray boom 30 includes a number of sections 38. In the extended position 36, the sections 38 of the boom 30 are oriented in line with each other so as to extend outward and be cantilevered from the lift arm assembly 32 of the sprayer 10. The sections 38 are configured to be connected to each other via hinges that allow the sections 38 to fold in on each other and transition the boom 30 from the extended position 36 to a folded position 40, as shown in FIGS. 6-9. The boom 30 may then be rotated from the folded position 40, in which the boom 30 is perpendicular to the sprayer 10, to the retracted position 34, in which the boom 30 is parallel to the sprayer 10. In the representative embodiment of the invention, the spray boom 30 includes three (3) sections 38. In other embodiments, of the invention, the spray boom 30 may include any number of sections 38.

As stated above, FIG. 1 depicts the spray boom 30 in the extended position 36. Each section 38 extends from a first end 42 to a second end 44. The first section 38a is positioned adjacent the sprayer 10. As shown, the first end 42a of the first section 38a is coupled to the lift arm assembly 32 of the sprayer 10. Meanwhile, the first end 42b of the second section 38b is pivotably coupled to the second end 44a of the first section 38a via a hinge 46. Similarly, the first end 42c of the third section 38c is pivotably coupled to the second end 44b of the second section 38b via another hinge 48. In the representative embodiment of the invention, a wheel 50 is disposed at hinge 46 and a wheel 52 is disposed at hinge 48. The wheels 50, 52 are configured to extend from the boom 30 and contact the ground in order to assist in supporting the boom 30 when it is in the extended position 36.

Figure 2:
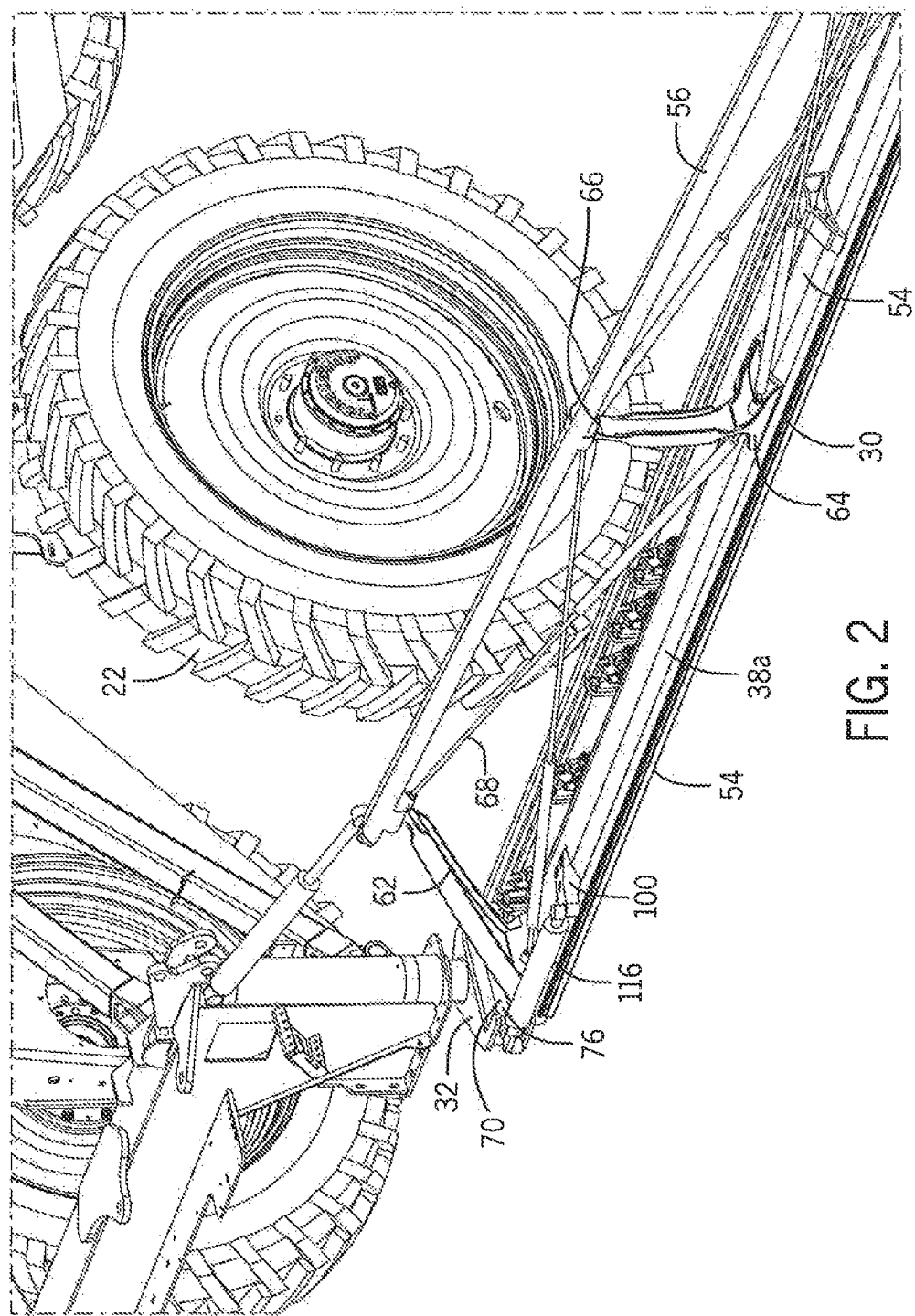
FIG. 2 is an enlarged perspective view of a section of the spray boom of FIG. 1.

Referring next to FIG. 2, an enlarged perspective view is shown of the first section 38a of the boom 30. The first section 38a includes a first support member 54 and a second support member 56. When the boom 30 is in the extended position 36, the first support member 54 may be oriented parallel to the ground. However, adjustment of the lift arm assembly 32 adjusts the height of the first end 42a of first section 38a, which may affect the orientation of the first support member 54 as it extends from the first end 42a to the second end 44a. The second support member 56 is disposed above the first support member 54 and extends from a first end 58 to a second end 60. As shown in FIG. 2, the second support member 56 may be oriented at an angle with respect to the first support member 54. For example, the second support member 56 may be oriented so that the second end 60 is closer to the first support member 54 than the first end 58.

A number of vertical supports shown as vertical support elements 62 may be oriented to extend from the first support member 54 to the second support member 56. Each vertical support element 62 includes a first end 64 coupled to the first support member 54 and a second end 66 coupled to the second support member 56. As shown in FIG. 2, the vertical support elements 62 may be distributed along the length of the first section 38a. While the representative embodiment of the invention illustrates the use of three (3) vertical support element 62, varying embodiment of the invention may use any number of vertical support elements 62 extending between any locations along the lengths of the first and second support members 54, 56. As will be described in further detail below, the vertical support elements 62 are configured to offset the support members 54, 56 so that they are oriented along different vertical planes.

The first section 38a may also include a number of struts 68 extending between adjacent vertical supports or vertical support elements 62. The first section 38 may include struts 68 along the entire length of the first section 38a, from a location adjacent the first end 42a to a location adjacent the second end 44a. In the representative embodiment of the invention, two (2) struts 68 extend between adjacent vertical support elements 62. For example, one strut 68 may extend from the second end 66 of the vertical support element 62 adjacent the first end 58 of the second support member 56 to the first end 64 of the next vertical support element 62, while another strut 68 may extend from the first end 64 of the vertical support element 62 adjacent the first end 58 of the second support member 56 to the second end 66 of the next vertical support element 62. That is, the two (2) struts 68 between each vertical support element 62 may crisscross as they extend between the vertical support elements 62. FIG. 2 further illustrates that a strut 68 may extend from the hinge 46 to a location on the second section 38b.

In another embodiment of the invention, a single strut 68 may extend from the second end 66 of the vertical support element 62 adjacent the first end 58 of the second support member 56 to the first end 64 of the next vertical support element 62, another strut 68 may extend from the first end 64 of that vertical support element 62 to the second end 66 of the next vertical support element 62, and anther strut 68 may extend from the second end 66 of the that vertical support element 62 to the hinge 46 located adjacent the second end 44a of the section 38a. That is, adjacent struts 68 are oriented to alternate diagonally between the first and second ends 64, 66 of adjacent vertical support elements 62 as the struts 68 span the length of the section 38a. As a result, the second and third sections 38b, 38c are supported by the strength of the support members 54, 56, vertical support elements 62, and struts 68 of the first section 38a.

Figure 3:
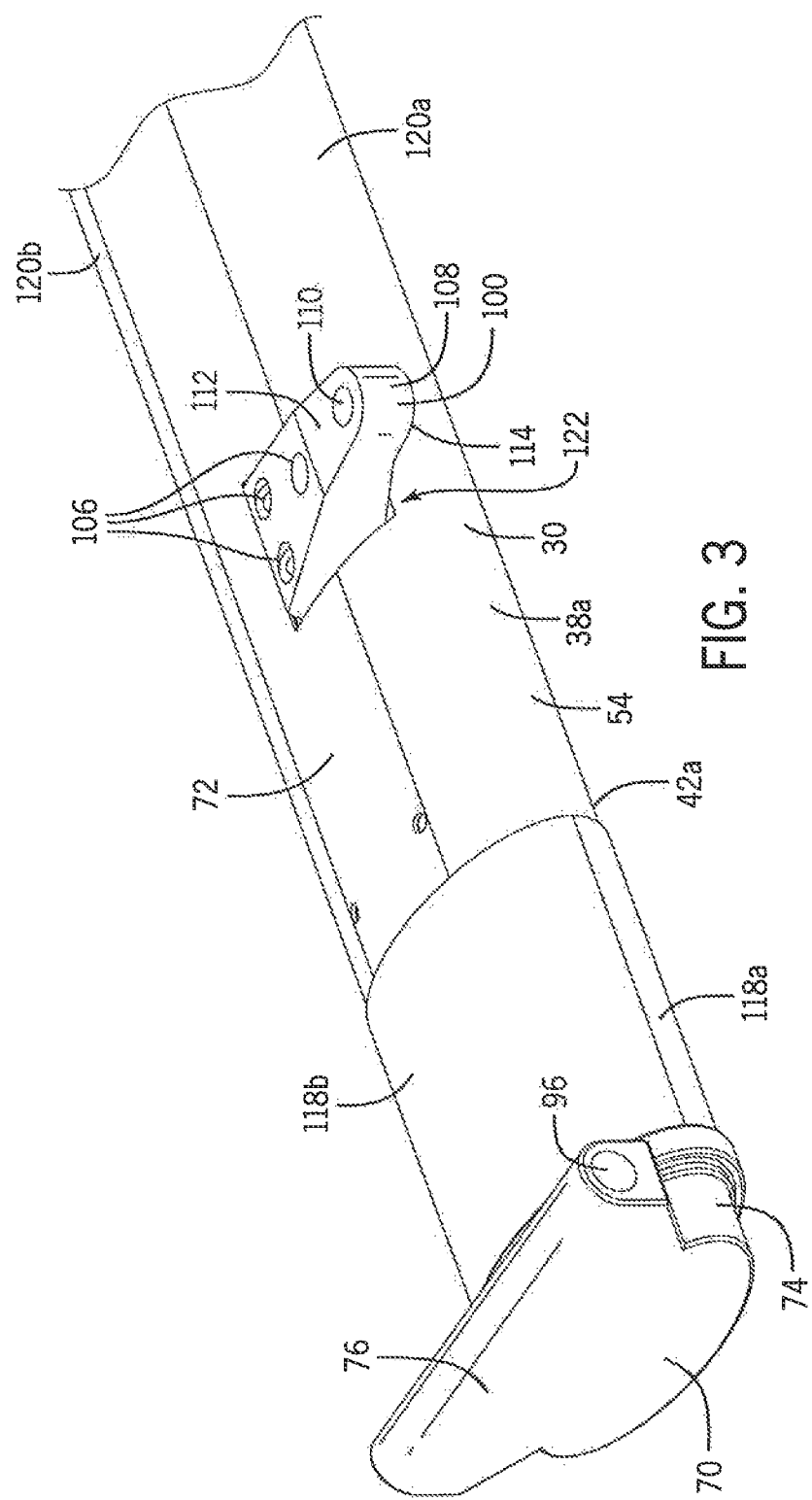
FIG. 3 is a perspective view of an end of a support segment of the section of the spray boom of FIG. 2.
Figure 4:
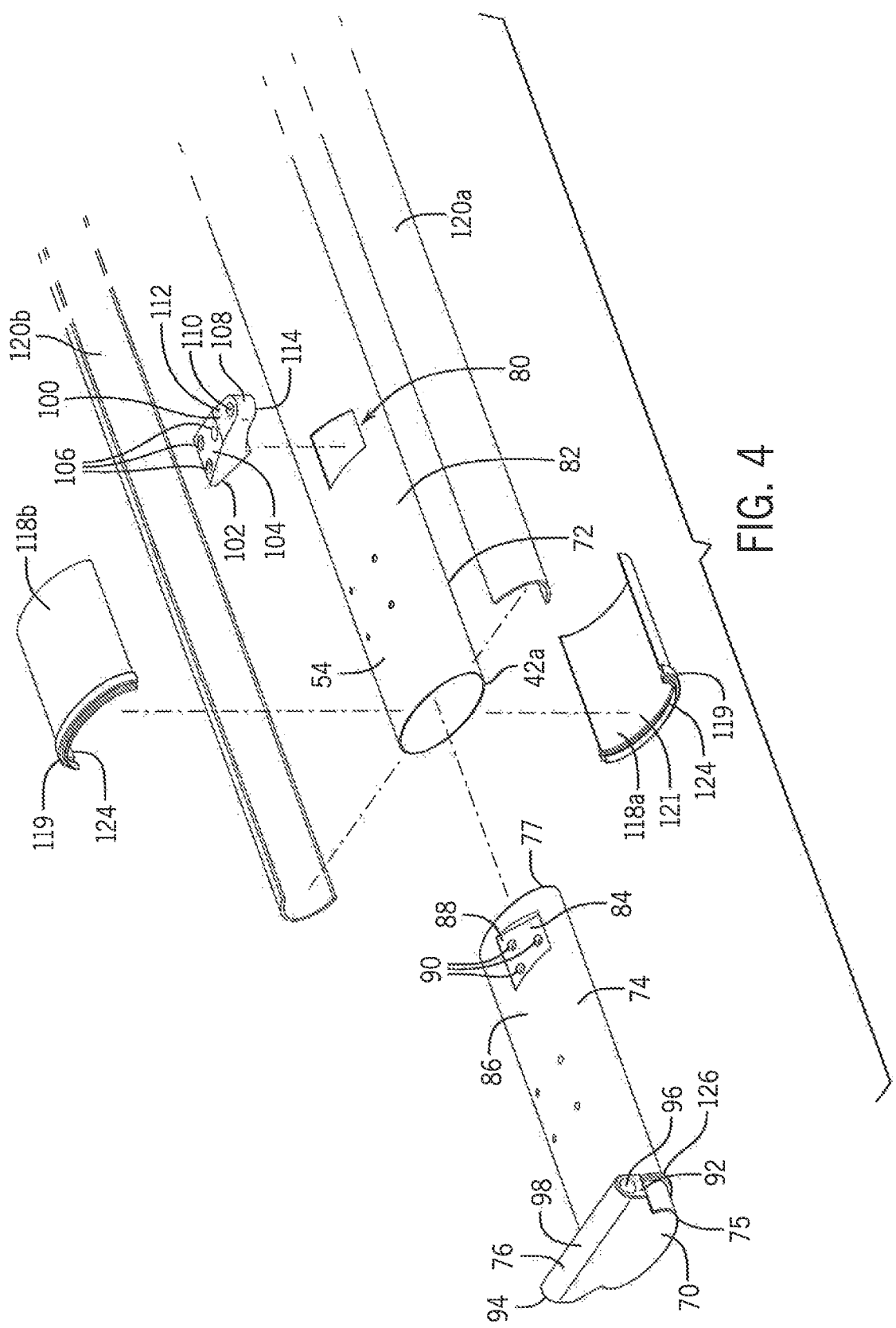
FIG. 4 is an exploded perspective view the end of the support segment of the spray boom from FIG. 3.

Now referring to FIGS. 3 and 4, perspective views of the first end 42a of the first support member 54 of the first section 38a are shown. A hinge casting 70 is disposed at the first end 42a of the support member 54. The hinge casting 70 is configured to couple the boom 30 to the lift arm assembly 32. As shown in the exploded perspective view of FIG. 4, the support member 54 comprise a hollow tube 72 constructed from a composite material, such as, but not limited to, carbon fiber. The hinge 70 includes an extension portion 74 and a hinged portion 76 disposed at a first end 75 of the extension portion 74. The hinge 70 may be constructed from a light-weight resilient material, such as, but not limited to, aluminum.

As shown, the hinged portion 76 extends upward from the extension portion 74 at the first end 75 of the extension portion 74. The hinged portion 76 includes a first side 92 and a second side 94 disposed opposite each other and perpendicular to the first end 75 of the hinge 70. In the representative embodiment of the invention, the width of the hinged portion 76, which extends from the first side 92 to the second side 94, is greater than the width of the extension portion 74. In turn, the hinged portion 76 flares as it extends upward from the extension portion 74 to the final width of the hinged portion 76 at the first and second sides 92, 94. In other embodiments of the invention, the width of the hinged portion 76 may be greater than, less than, or equal to the width of the extension portion 74.

Further, a mounting channel 96 may be formed in the hinged portion 76 and extend from the first side 92 to the second side 94 of the hinged portion 76. As shown in FIGS. 3 and 4, the mounting channel 96 may be disposed adjacent an upper end 98 of the hinged portion 76. In varying embodiments of the invention, the mounting channel 96 may be disposed at anywhere along the hinged portion 76 of the hinge 70. As will be described in further detail below, the channel 96 assists in mounting the boom 30 to the lift arm assembly 32.

The extension portion 74 is configured to extend into and be disposed within the hollow tube structure 72 of the support member 54. In the representative embodiment of the invention, both the extension portion 74 and the hollow tube 72 are cylindrical in shape. An outer surface 78 of the extension portion 74 is configured to be in contact with an inner surface 79 of the hollow tube 72 of the support member 54 along the length of the extension portion 74. In turn, the distributed load and stresses of the boom 30 are distributed across a length of the hollow tube 72 of the support member 54 and passed uniformly to the extension portion 74 of the hinge 70.

FIG. 4 further illustrates an opening 80 formed in a surface 82 of the hollow tube 72. The opening 80 is formed in the surface 82 of the hollow tube 72 at a location spaced apart from the end 42a of the hollow tube 72. A corresponding notch 84 is formed in a surface 86 of the extension portion 74 at a location adjacent a second end 77 of the extension portion 74. The notch 84 and opening 80 are located and configured to align with each other when the hinge 70 is disposed within the end 42a of the hollow tube 72. In the representative embodiment of the invention, the notch 84 is formed in the surface 86 of the extension portion 74 to provide a planar surface 88. As shown in FIG. 4, the planar surface 88 includes a plurality of mounting holes 90 formed therein.

As shown in FIGS. 3 and 4, a bracket 100 configured to extend through the opening 80 of the tube 72 and be disposed within the notch 84 of the extension portion 74 of the hinge 70. The bracket 100 includes a planar surface 102 that is configured to engage with the planar surface 88 of the notch 84. That is, the planar surface 88, 102 are oriented at similar angles. A surface 104 of the bracket 100 above the planar surface 88 includes a plurality of orifices 106 formed through the bracket 100 from the planar surface 102 to the surface 104. The orifices 106 are configured to align with the mounting holes 90 of the notch 84. As a result, the bracket 100 may be mechanically fastened to the extension portion 74 of the hinge 70 by way of fasteners extending through the orifices 106 and into the mounting holes 90. Once the bracket 100 has been coupled to the extension portion 74 of the hinge 70, the hinge 70 is locked in place within the tube 72. The bracket 100 also includes an extension portion 108, which extends outward from the planar surface 102. The extension portion 108 may includes an mounting orifice 110 formed therein and extending from a top surface 112 of the extension portion 108 to a bottom surface 114 of the extension portion 108. As will be described in further detail below, the mounting orifice 110 assists in mounting the boom 30 to the lift arm assembly 32.

Further yet, FIGS. 3 and 4 further illustrate the inclusion of a collar 118 and contoured edges 120 partially surrounding portions of the tube 72 of the support member 54. Referring first to the contoured edges 120, the contoured edges 120 may be in the form of a front edge 120a and a rear edge 120b contoured to fit with the outer surface 82 of the tube 72. As shown in further detail in FIG. 3, the front and rear edges 120a, 120b are aligned with the front and rear portions of the tube 72 and may extend along a portion or the entire length of the tube 72. In embodiments of the invention, wherein one of the contoured edges 120 extends to cover part or all of the opening 80 in the tube 72, a notch or opening, such as notch 122 in FIG. 3, may be formed in the contoured edge 120 to accommodate the opening 80. The contoured edges 120 may be constructed from a light-weight resilient material, such as, but not limited to, aluminum in order to protect the composite material of the tube 72 from damage at its most vulnerable areas.

Next, the collar 118 is configured to surround the tube 72 at the first end 42a of the support 54. The collar 118 may include a first portion 118a contoured to interfit with the bottom half of the tube 72 and a second portion 118b contoured to interfit with the top half of the tube 72. As shown in FIG. 4, the collar portions 118a, 118b may each include a first interfit element 124 formed in an inner surface 121 thereof at a first end 119 of each collar portion 118a, 188b. The interfit elements 124 are configured to align with each other when the collar portions 118a, 188b are joined together to form the collar 118 and surround the tube 72. Further yet, the hinge may include a second interfit element 126 formed on the outer surface 86 of the extension portion 74 of the hinge 70 at a location spaced inward from the first end 75 of the hinge 70. In turn, the first and second interfit elements 124, 126 are configured to interfit and connection with each other to secure the collar 118 to the hinge 70 and tube 72. Further, the collar 118 may extend along the tube 72 for any length.

Referring again to FIG. 2, the lift arm assembly 32 is coupled to the boom 30 at the hinged portion 76 of the hinge 70 via the channel 96 and the bracket 100 via the mounting orifice 110. In regard to the channel 96 of the hinge 70, a coupling device may extend through the channel 96 to secure the hinge 70 to the lift arm assembly. In the representative embodiment of the invention, a mounting element 116 extends from the lift arm assembly 32 to the bracket 100. In turn, a coupling device may extend into the mounting orifice 110 of the bracket 100 to couple to the bracket 100 to the mounting element 116. By connecting the boom 30 to the lift arm assembly 32 at both the bracket 100, which is disposed adjacent the second end 77 of the hinge 70, and the hinged portion 76, which is disposed at the first end 75 of the hinge 70, the stresses of the boom 30 are dispersed along the length of the hinge 70 within the tube 72.

The present invention has been described in terms of the preferred embodiment. The several embodiments disclosed herein are related as being related to the assembly as generally shown in the drawings. It is recognized that equivalents, alternatives, and modifications, aside from those expressly stated, the embodiments summarized, or the embodiment shown in the drawings, are possible and within the scope of the appending claims. The appending claims cover all such alternatives and equivalents.

What is claimed is:

1. A spray boom support assembly for an agricultural machine comprising:
    a lift arm assembly of the agricultural machine;
    a hollow tube including an opening formed through a surface thereof at a location spaced apart from a first end of the hollow tube; and
    a hinge inserted into the first end of the hollow tube, the hinge including:
    an extension portion extending into the hollow tube for a length, wherein the extension portion includes a notch in a surface thereof at a location adjacent a second end of the extension portion, wherein the opening and the notch are aligned with each other; and
    a hinged portion extending upward from a first end of the extension portion, wherein the hinge is coupled to the lift arm assembly of the agricultural machine at a first coupling location by way of the hinged portion; wherein the first end of the extension portion is adjacent the first end of the hollow tube;
    wherein a bracket is coupled to the extension portion of the hinge and extends from the notch through the opening, the bracket being configured to prevent the extension portion and the hollow tube from sliding relative to one another; wherein the bracket includes a mounting orifice formed therethrough; and
    wherein the hinge is coupled to the lift arm assembly at a second coupling location different from the first coupling location by way of the bracket.

2. The spray boom support assembly of claim 1 wherein the hollow tube comprises a composite material.

3. The agricultural machine of claim 1 wherein the notch forms a planar surface on the extension portion; and wherein the bracket is coupled to the planar surface on the extension portion.

4. The agricultural machine of claim 1 wherein the bracket includes a planar surface configured to interfit with the planar surface on the extension portion.

5. The agricultural machine of claim 1 wherein the bracket is mounted to the lift arm assembly by the mounting orifice.

6. The agricultural machine of claim 1 wherein the hinged portion includes a channel extending from a first side of the hinged portion to a second side of the hinged portion for mounting the hinge to the lift arm assembly.

7. The spray boom support assembly of claim 6 wherein the channel is disposed adjacent an upper surface of the hinged portion.

8. The agricultural machine of claim 1 wherein the inner surface of the tube and the outer surface of the extension portion are elliptical or oval in shape.

* * * * *